Sept. 30, 1969     F. FREEMAN ET AL     3,469,868

COUPLING

Filed Sept. 25, 1967

Inventors
Frederick Freeman
Peter King
By
Cushman, Darby & Cushman
Attorneys

United States Patent Office 3,469,868
Patented Sept. 30, 1969

3,469,868
COUPLING
Frederick Freeman and Peter King, Derby, England, assignors to Rolls-Royce Limited, Derby, England, a British company
Filed Sept. 25, 1967, Ser. No. 670,143
Claims priority, application Great Britain, Oct. 14, 1966, 46,105/66
Int. Cl. F16d *1/06;* F16c *3/10*
U.S. Cl. 287—52                5 Claims

ABSTRACT OF THE DISCLOSURE

A coupling comprises first and second shafts having interengaging splines, and a coupling member which is rotatably connected to the first shaft. The coupling member and the second shaft are provided with abutment portions which may be brought into and out of alignment with each other on rotation of the coupling member to prevent and permit relative axial movement of the coupling member and the second shaft. A releasable locking device is provided for locking the coupling member to the second shaft with their abutment portions in alignment, release of the locking device permitting the coupling member to be rotated to bring the abutment portions out of alignment so that axial separation of the shafts may be effected.

---

This invention concerns a coupling, and although the invention is not so restricted, it is more particularly concerned with a coupling for use in coupling together shafts of a gas turbine engine.

According to the present invention, there is provided a coupling comprising first and second shafts having interengaging splines, a coupling member which is connected to the first shaft but is rotatable with respect thereto, the coupling member and the second shaft being respectively provided with abutment portions which may be brought into and out of alignment with each other on rotation of the coupling member respectively to prevent and permit relative axial movement of the coupling member and second shaft, and a releasable locking device for locking the coupling member to the second shaft with their abutment portions in alignment, release of the said locking device permitting the coupling member to be rotated to bring the abutment portions out of alignment so that relative axial separation of the said shafts may be effected.

The abutment portions are preferably respectively constituted by axially engageable splines on the coupling member and on the second shaft, the said axially engageable splines having the same angular pitch as, and being aligned with, the said interengaging splines of the second shaft.

The axially engageable splines on the second shaft may be integral with the said interengageable splines thereon or, if desired, may be separate therefrom.

The axially engageable splines on the coupling member may be mounted in an annular groove in the axially engageable splines on the second shaft.

The releasable locking device preferably locks the said coupling member to a part which is splined to the second shaft.

The releasable locking device is preferably provided with resilient means which urge it towards the locked position.

Thus, the releasable locking device may comprise a locking member which, when in the locked position, is disposed in aligned holes in the coupling member and in the said part, the locking member being adapted to be depressed against the action of the resilient means so that it is removed from the hole in the said part.

The said holes are preferably radially aligned, the locking member being depressable by means of a radially disposed bar.

The coupling member preferably has a threaded connection with the first shaft.

The invention also comprises a gas turbine engine provided with a coupling as set forth above, the first and second shafts respectively carrying a compressor and a turbine of the engine.

Figure 1:
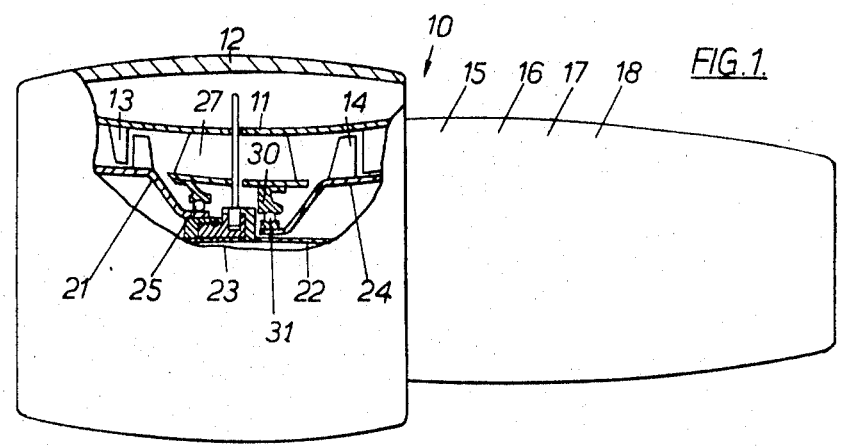
Figure 2:
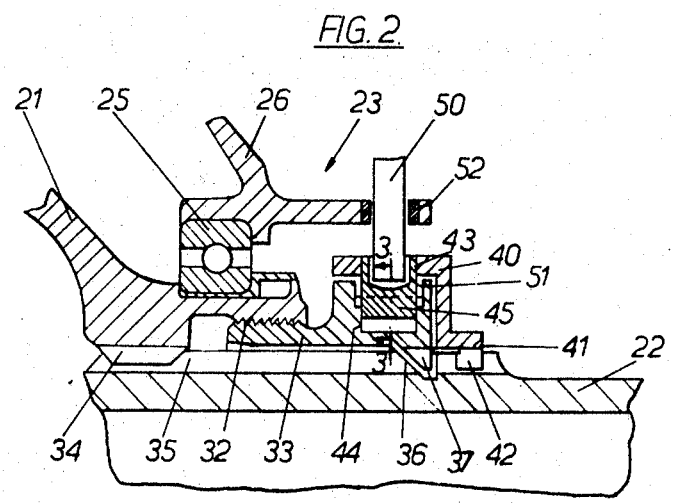
Figure 3:
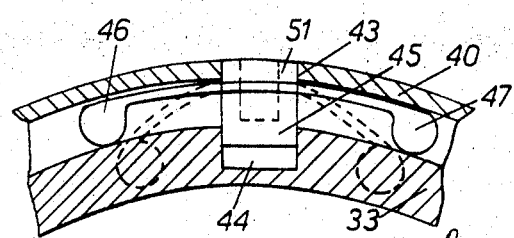

The invention is illustrated, merely by way of example, in the accompanying drawings, in which:

FIGURE 1 is a diagrammatic representation, partly in section, of a gas turbine engine provided with a coupling according to the present invention, FIGURE 2 is a broken-away sectional view of part of the structure of FIGURE 1 on a larger scale, and FIGURE 3 is a broken-away sectional view, on a still larger scale, taken on the line 3—3 of FIGURE 2.

Referring to the drawings, a gas turbine engine 10 has an engine casing 11 about whose upstream portion there is mounted a fan casing 12 which forms the housing for a low pressure front fan (not shown).

Mounted in flow series within the engine casing 11 is an intermediate pressure compressor 13, a high pressure compressor 14, a fully tnnular combustion chamber 15, a high pressure turbine 16 which drives the high pressure compressor 14, an intermediate pressure turbine 17 which drives the intermediate pressure compressor 13, and a low pressure turbine 18 which drives the low pressure fan.

The intermediate pressure compressor 13 and the intermediate pressure turbine 17 are respectively mounted on shafts 21, 22 which are interconnected by a coupling 23. Mounted internally of and concentrically with the shaft 22 are shafts (not shown) which transmit power from the low pressure turbine 18 to the low pressure fan, while there is mounted concentrically about the shaft 22 a shaft 24 on which is mounted the high pressure compressor 14 and the high pressure turbine 16.

The downstream end of the shaft 21 is mounted within a ball bearing 25. The ball bearing 25 is supported by wall structure 26 from a hollow strut 27 which is itself supported from the engine casing 11. The hollow strut 27 also supports wall structure 30 which carries a bearing 31 within which the upstream end of the shaft 24 is journalled.

The downstream end of the shaft 21 has a threaded connection at 32 to the upstream end of a coupling member 33 which may thus be rotated with respect to the shaft 21.

The shafts 21, 22 are respectively provided with interengaging splines 34, 35. The splines 35 have an annular groove 36 formed therein within which are mounted splines 37 on the coupling member 33. The splines 37 have the same angular pitch as, and are aligned with, the splines 35 so as to be axially engageable therewith.

Thus when the coupling member 33 is in the position shown in FIGURE 2 in which the splines 35, 37 are in alignment with each other, relative axial movement of the coupling member 33 and shaft 22 cannot occur, to any significant extent, because if it did, the splines 36, 37 would form abutment portions which would abut each other to prevent it. If, however, the coupling member 33 is rotated through half the angular pitch of its splines 37, relative axial movement of the coupling member 33 and shaft 22 can occur so as to permit axial separation of the shafts 21, 22.

Mounted concentrically about the coupling member 33 is an annular part 40 having a flange 41 which is provided with splines 42 which engage the splines 35 on the shaft 22.

The annular part 40 and the coupling member 33 are respectively provided with radially aligned square-section holes 43, 44. Mounted in the holes 43, 44 is a square-section locking member 45 which can be depressed into the hole 44 to a position in which it is no longer in engagement with the hole 43.

The locking member 45 is provided with spring ears 46, 47 which urge the locking member radially outwardly to the position shown in FIGURES 2 and 3. In this position, the locking member 45 serves to lock together the coupling member 33 and annular part 40 so as to prevent rotation of the coupling member 33 and thus prevent the splines 37 being moved out of alignment with the splines 35. Accordingly, in this position the shafts 21, 22 cannot be separated since any attempt to separate them will be resisted by the abutment of the splines 35, 37. Moreover, the coupling member 33 cannot be rotated to bring the splines 35, 37 out of alignment with each other until the locking member 45 has been depressed, against the resilient action of the spring ears 46, 47 so as to remove it from the hole 43.

An alternative form of the locking member 45 (not shown) has a hollow interior inside which fits a coil spring which performs the resilient action of the spring ears 46, 47. The outer end of this locking member is provided with radially extending splines which engage with corresponding splines in the hole 43 to prevent rotational movement of the locking member.

Depression of either type of locking member 45 may be effected by a radially disposed square-section bar 50 which may be introduced into a square-section hole 51 in the locking member 45, the square-section hole 51 being appreciably wider than the bar 50.

The bar 50 may be introduced through the hollow strut 27 and through a hole 52 in the wall structure 26.

In order to uncouple the shafts 21, 22, the bar 50 is inserted through the hollow strut 27 and through the hole 52. The intermediate pressure compressor 13 and its shaft 21 is now rotated until the bar 50 enters the hole 51 in the locking member 45. The bar 50 is then depressed so as to remove the locking member 45 from the hole 43 and thus permit rotation of the coupling member 33 with respect to the shaft 22. The bar 50 holds the coupling member 33 stationary, but limited further rotation of the shaft 21, annular part 40, and shaft 22, all of which are splined together, will bring the splines 37 of the coupling member 33 out of alignment with the splines 35 on the shaft 22. The shaft 22 can then be withdrawn axially rearward. The peripheral movement of the coupling member 33 relative to the annular part 40 is restricted to half the angular pitch of the splines 35 by virtue of the bar 50 striking the edge of the hole 51 in the locking member 45.

Adjustment of the position of the intermediate pressure turbine 17 may then be effected by screwing the coupling member 33 into or out of the shaft 21, the rotor of the intermediate pressure turbine 17 then being offered up to the shaft 22 and connected thereto. When this has been done, the shafts 21, 22 are turned through half a pitch of the splines 35 with the result that the locking member 45 will spring radially outwardly so as to move into the hole 43 and thus engage the annular part 40. This effects locking of the coupling 23.

The spring ears 46, 47 or the coil spring of the alternative form of locking member, are sufficiently powerful to raise the bar 50 a visible amount and thus provide a check that the coupling has been locked. This check may also be provided by virtue of the fact that with the bar 50 in engagement with the hole 51, but not depressed, neither of the shafts 21, 22 can be rotated if the lock is operating properly. If further checking is desired, this can be effected by inserting an "intrascope" through the hole 52 and observing the position of the locking member 45.

As will be appreciated, the coupling 23 permits rapid access to the annular combustion chamber 15 by removing the rotors of the low pressure turbine 18 and of the intermediate pressure turbine 17.

We claim:
1. A coupling: comprising first and second shafts having interengaging splines; a coupling member connected to said first shaft but is rotatable with respect thereto; abutment portions provided on said coupling member and said second shaft respectively, the abutment portions being adapted to be brought into and out of interlocked alignment with each other on rotation of said coupling member respectively to prevent and permit relative axial movement of the coupling member and second shaft; a part splined to said second shaft, and radially aligned holes in said coupling member and in said part; and a releasable locking device for rotatably locking said coupling member to said part which is splined to the second shaft when said abutment portions are in alignment, release of said locking device permitting said coupling member to be rotated to bring said abutment portions out of alignment so that relative axial separation of the said shafts is effected, the releasable locking device comprising resilient means radially urging a releasable locking member towards the locked position which, when in the locked position, is disposed in said radially aligned holes provided in said coupling member and in said part, said locking member being depressable by means of a radially disposed bar against the action of the resilient means so that it is removed from the hole in said part.

2. A coupling as claimed in claim 1 in which axially engageable splines on the coupling member and on the second shaft constitute the abutment portions respectively, the said axially engageable splines having the same angular pitch as, and being aligned with, the said interengaging splines of the second shaft.

3. A coupling as claimed in claim 2 in which the axially engageable splines on the second shaft are integral with the said interengageable splines thereon.

4. A coupling as claimed in claim 2 in wchih an annular groove is provided in the axially engageable splines on the second shaft, said axially engageable splines on the coupling member being mounted in said annular groove.

5. A coupling as claimed in claim 1 in which the coupling member has a threaded connection with the first shaft.

References Cited
UNITED STATES PATENTS 2,525,695  10/1950  Lombard _____ 64—9
2,785,550  3/1957   Petrie _____ 287—53 XR
2,948,559  8/1960   Recker.

DAVID J. WILLIAMOWSKY, Primary Examiner
ANDREW V. KUNDRAT, Assistant Examiner

U.S. Cl. X.R.
64—9